United States Patent [19]

Oswald

[11] 4,233,020
[45] Nov. 11, 1980

[54] COLLAPSIBLE MANDREL

[75] Inventor: Leo A. Oswald, Huntingdon, Pa.

[73] Assignee: Owens-Corning Fiberglas Corporation, Toledo, Ohio

[21] Appl. No.: 20,122

[22] Filed: Mar. 13, 1979

[51] Int. Cl.³ .............................................. B29C 13/04
[52] U.S. Cl. ...................................... 425/471; 156/425;
242/7.22; 269/48.1; 425/DIG. 14
[58] Field of Search ............ 249/177, 179, 183, 187 R,
249/188, 209; 156/425; 425/470, DIG. 14, 121,
126, 471; 269/48.1; 242/7.21, 7.22, 110, 115, 18
G, 110.9

[56] References Cited

U.S. PATENT DOCUMENTS

| | | | |
|---|---|---|---|
| 414,728 | 11/1889 | Seneca | 269/48.1 |
| 797,173 | 8/1905 | Chidester | 249/179 |
| 860,144 | 7/1907 | Melton | 249/179 |
| 1,452,628 | 4/1923 | Tingley | 249/179 |
| 1,540,185 | 6/1925 | Richards | 249/179 |
| 2,387,815 | 10/1945 | Troiel | 249/179 |
| 2,878,545 | 3/1959 | Lowe | 249/179 |
| 3,000,585 | 9/1961 | Sokal | 242/18 G |
| 3,226,273 | 12/1965 | Becker | 156/195 |
| 3,421,712 | 1/1969 | Scroggie et al. | 242/110.1 |
| 4,134,569 | 1/1979 | Peppel | 249/179 |
| 4,153,232 | 5/1979 | Burchett | 249/219 R |

*Primary Examiner*—Murray Tillman
*Assistant Examiner*—Arthur H. Koeckert
*Attorney, Agent, or Firm*—Ronald C. Hudgens; Kenneth H. Wetmore; Paul J. Rose

[57] ABSTRACT

The mandrel has a cantilever-type mounting and includes a rotatable longitudinally slit tubular steel shell providing a molding surface on which thermosetting resin and glass fiber reinforcing material may be deposited to form tank bodies or pipe. A row of pneumatic actuators mounted inside the shell and spaced axially thereof includes piston rods attached to the shell along the slit on one side thereof. Retraction of the piston rods collapses the shell, which is flexible over the greater portion of its periphery and supported in the flexible portion by a plurality of rows of pivotable turnbuckle connectors or support rods, for removal of a cured tank body or pipe.

5 Claims, 7 Drawing Figures

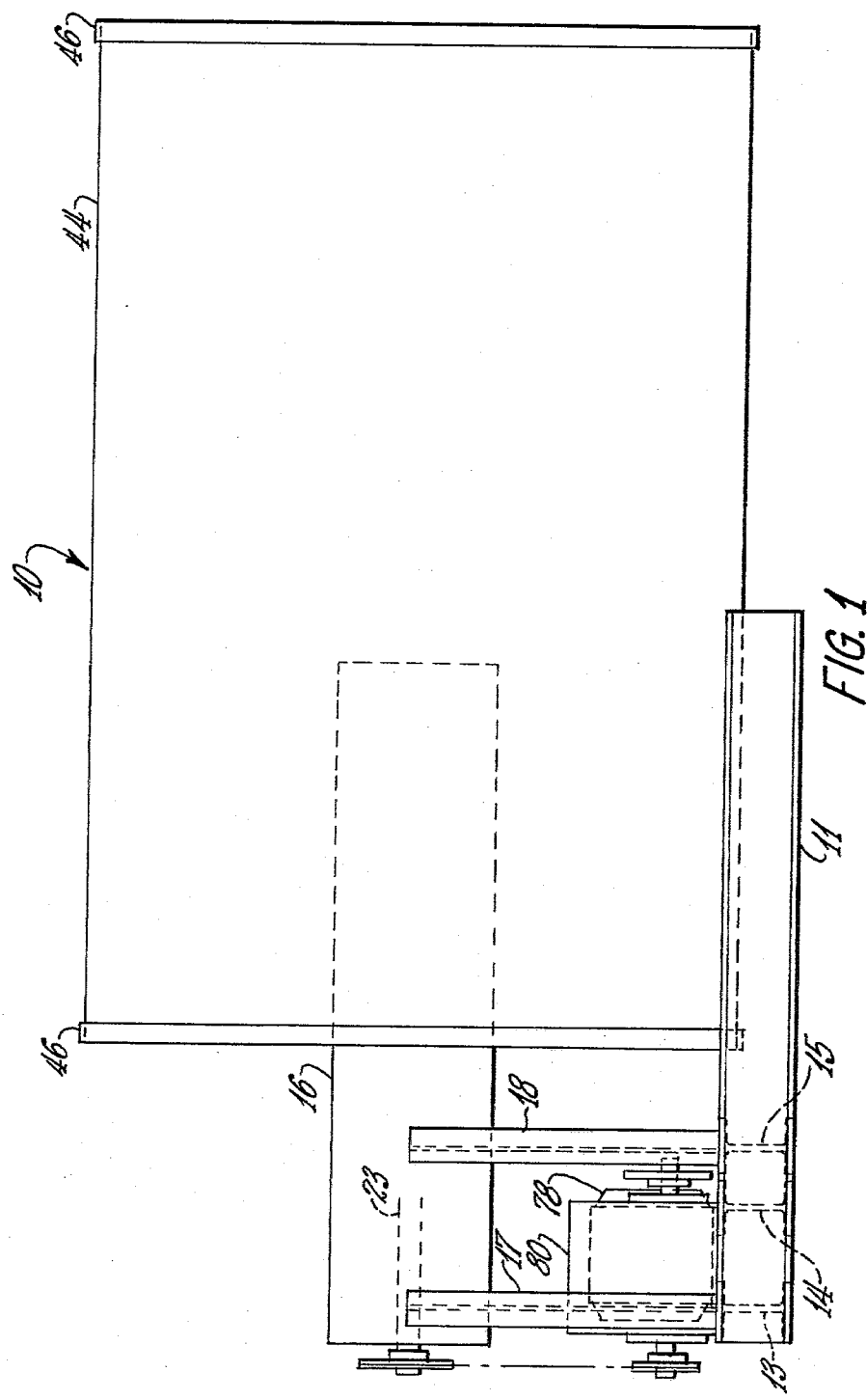

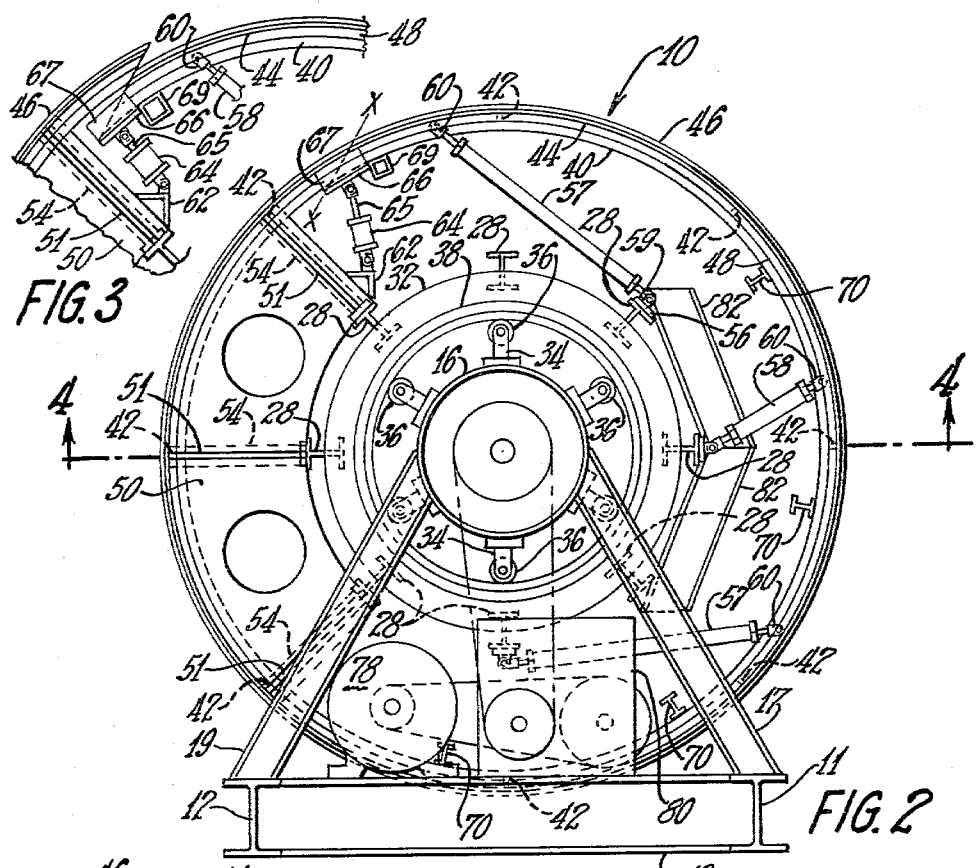
FIG. 3
FIG. 2
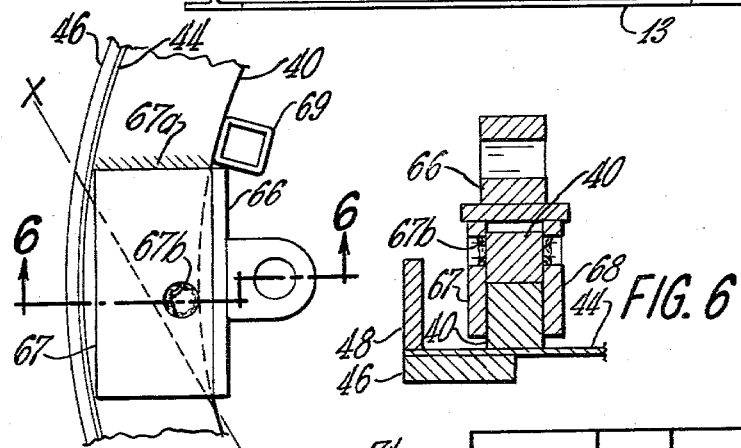
FIG. 5
FIG. 6
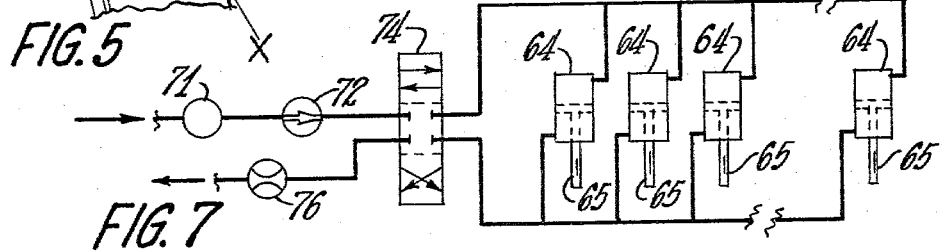
FIG. 7

COLLAPSIBLE MANDREL

This invention relates generally to collapsible mandrels, and more particularly to a collapsible mandrel useful in the production of reinforced plastic pipe or tank bodies of relatively large diameter, for example ten to fourteen feet (3.048 to 4.267 meters).

An object of the invention is to provide a collapsible mandrel including a rotatable longitudinally slit tubular steel shell rigid over a minor portion of its periphery and flexible over a major portion of its periphery, the flexible portion being supported by a plurality of rows of pivotable support rods or turnbuckle connectors.

Another object is to provide such a mandrel including a row of pneumatic actuators mounted inside the shell and spaced axially thereof, the actuators having piston rods attached to the shell along and on one side of the slit and being retractable to collapse the shell.

Other objects and advantages will become apparent when the following specification is considered along with the accompanying drawings in which:

FIG. 1 is a side elevational view of a rotatable collapsible mandrel constructed in accordance with the invention and support and driving means therefor;

FIG. 2 is a rear elevational view of the apparatus of FIG. 1 with certain portions omitted;

FIG. 3 is a fragmentary view similar to FIG. 2, but showing the mandrel in a collapsed condition;

FIG. 5 is an enlarged fragmentary view, similar to portions of FIGS. 2 and 3, but with certain parts omitted, showing the slit portion of the shell of the mandrel of FIG. 1;

FIG. 6 is a sectional view taken generally along the line 6—6 of FIG. 5; and

FIG. 7 is a diagrammatic view of a pneumatic control system for collapsing and restoring the mandrel.

Figure 4:
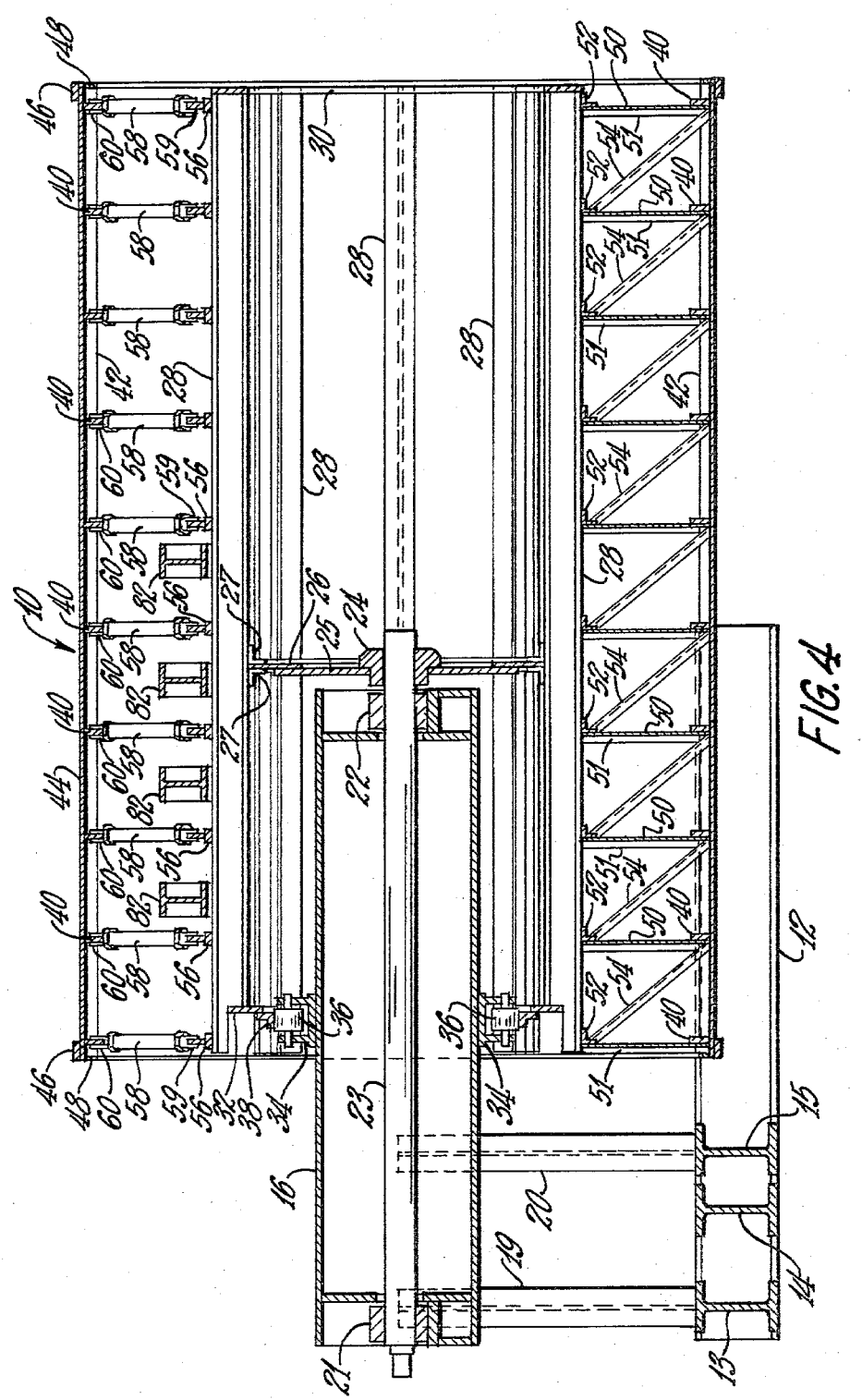
FIG. 4 is a vertical sectional view of the mandrel support means of FIGS. 1 and 2, but showing the mandrel in section taken along the line 4—4 of FIG. 2, with certain portions omitted.

With respect to the drawings, FIGS. 1, 2, and 4 show a collapsible mandrel 10 constructed in accordance with the invention. The mandrel 10 is rotatably mounted on stationary framework including a pair of spaced, parallel I-beams 11 and 12 extending axially of the mandrel and connected adjacent one end by three I-beams 13, 14, and 15. Preferably the beams 11-15 are mounted in concrete generally flush with a floor. A stationary sleeve 16 is mounted on a pair of I-beam braces 17 and 18 joined to the I-beam 11 and a pair of I-beam braces 19 and 20 joined to the I-beam 12. Two bearings 21 and 22 are suitably secured within the sleeve 16 respectively adjacent opposite ends thereof for rotatably supporting a shaft 23 of the mandrel 10.

A front end portion of the shaft 23 has a hub 24 rigidly secured thereto. A circular plate 25 is secured to the hub 24. Bolted to the plate 25 is another plate 26 having a plurality of pairs of angle irons 27 welded thereto respectively on opposite sides. Each pair of angle irons 27 has an I-beam 28 welded thereto. In the illustrated example, there are eight I-beams 28 in equally arcuately spaced relationship, as best shown in FIG. 2. The front ends of the I-beams 28 are welded to a ring-like plate 30 (FIG. 4). The rear end portions of the I-beams 28 are notched on their radially inner portions and secured by welding to a ring-like plate 32 fitted within the notched portions. The I-beams 28 and the plates 30 and 32 form a rigid inner core of the mandrel 10. A plurality of bearing support members 34, six in the example shown, are secured to the stationary sleeve 16 in equally arcuately spaced relationship and each supports a roller bearing 36. A bearing collar 38 of L-shaped cross section is secured to the plate 32 and rotatably supported on the roller bearings 36.

A cylindrical grid is provided by a plurality of rings or ring-like plates 40, ten in the embodiment illustrated, equally spaced axially of the mandrel 10. Except for the two rings 40 at the ends of the mandrel 10, each ring 40 is connected on opposite sides respectively to two adjacent rings 40 by a plurality of equally arcuately spaced bars 42. Only eight rows of bars 42 are indicated in FIG. 2, but in the actual embodiment there are sixteen bars 42 between each pair of adjacent rings 40. A tubular steel shell 44 is welded to the rings 40 and bars 42. Two forming rings 46 are secured to the shell 44 respectively adjacent opposite ends. On the inside of the shell 44 respectively at opposite ends are two end support rings 48.

The rings 40, 46, and 48 and the shell 44 are slit along a chordal plane represented by the line X—X in FIGS. 2 and 5, to allow flexing thereof over a major portion of their periphery while a minor portion is rigidly braced. In the rigidly braced portion, the I-beams 28 in the northwest, west, and southwest positions from the shaft 23, as viewed in FIG. 2, are rigidly secured to the shell 44 by a plurality of spaced arcuate plates 50, ten in the embodiment shown, which extend through an arc of about ninety-eight degrees and are welded at their radially outer edges respectively to the rings 40. Each plate 50 is stiffened by three radially extending bars 51 spaced about forty-five degrees apart. At their radially inner edges, the plates 50 are welded respectively to angle irons 52 secured to the I-beams 28. For additional rigidity, between each two adjacent plates 50 three channel-shaped braces 54 are provided. Axially of the mandrel 10, the braces 54 are aligned respectively with the bars 51, but each brace 54 extends from the radially inner edge of one plate 50 to the radially outer edge of the adjacent plate 50. The outer end portions of the braces 54 are slotted to receive the respective bars 51.

Three of the five remaining I-beams 28 not secured to the plates 50, namely those in the south, east, and northeast positions from the shaft 23, as viewed in FIG. 2, are each provided with a plurality, ten in the embodiment shown, of male clevis brackets 56 welded in spaced relationship longitudinally along the radially outer flange portion of the I-beam. Pivotally connected to the male clevis brackets 56 on the south and northeast I-beams 28 are relatively long turnbuckle connectors or support members 57 each having a pair of female clevis brackets 59 and 60 respectively at opposite ends. The brackets 59 are pivotally connected to the brackets 56 and the brackets 60 are pivotally connected to the rings 40. The male clevis brackets 56 on the east I-beam 28 are provided with similar relatively short turnbuckle connectors or support members 58. The extended longitudinal axes of the lower turnbuckle connectors 57 in FIG. 2 substantially intersect the line at which the flexible portion of the shell 44 departs from the arcuate plates 50.

An angle iron 62 of a length about equal to that of the I-beams 28 is welded to the radial edge portions of the arcuate plates 50 adjacent the slit represented by the line X—X, at the radially inner ends thereof adjacent the respective I-beams 28. Ten pneumatic actuators, each including a cylinder 64 and a piston rod 65, are provided for collapsing the shell 44 and rings 40, 46, and 48. Each cylinder 64 has a female clevis bracket at its closed end, the female clevis bracket being pivotally connected to an appropriate male clevis bracket mounted on the angle iron 62. Each piston rod 65 includes a female clevis bracket on its outer end, the female clevis bracket being pivotally connected to a male clevis bracket 66 secured by a pair of spaced mounting plates 67 and 68 (FIG. 6) to a respective one of the rings 40 adjacent the slit, but only on the radially inner side of the slit. For example, each plate 67 is welded to its respective ring 40 along an edge 67a (FIG. 5) thereof and within a hole 67b therein. On the radially outer side of the slit represented by the line X—X, the plates 67 and 68 normally loosely straddle that portion of the respective ring 40.

Normally, the piston rods 65 are in their extended position and the shell 44 and rings 40, 46, and 48 are circular, as most clearly shown in FIG. 5 (ring 48 omitted). When the piston rods 65 are retracted, the shell 44 and the rings are flexed inwardly, as shown in FIG. 3. In order to insure flexing of all the rings 40 simultaneously, a box beam or square tube 69 is welded to all the rings 40 adjacent the male clevis brackets 66 on the radially inner side of the slit. The rings 40 are also tied together by four I-beams 70 arcuately spaced along the flexible portion of the peripheries of the rings.

A control system for the pneumatic actuators is schematically shown in FIG. 7 wherein numeral 71 designates a rotary joint connection to a supply of compressed air and numeral 72 designates a quick-disconnecting means used when the mandrel 10 is to be replaced by another mandrel of a different size. A four-way directional control valve 74 controls the direction of movement of the piston rods 65, and a restrictor valve 76 is included in the exhaust line from the cylinders 64. After the resin of a tank body or pipe is cured, the shell 44 is collapsed by retraction of the piston rods 65, and the tank body or pipe can then be easily removed from the mandrel 10.

A motor 78 and a gear reduction mechanism 80 are mounted on the I-beams 13 and 14 for rotatably driving the shaft 23 of the mandrel 10. On the three I-beams 28 opposite those secured to the arcuate plates 50, I-beam sections 82 may be provided as counterweights for the plates 50.

Various modifications may be made in the structure shown and described without departing from the spirit and scope of the invention.

I claim:

1. A rotatable collapsible mandrel (10) useful in the production of cylindrical fluid retaining walls of thermosetting resin and glass fiber reinforcing material, the mandrel (10) comprising a rigid inner core (28, 30, 32) rotatable about a horizontal axis, a tubular steel shell (44) having a longitudinal slit (x—x) to permit collapsing thereof by flexure of a portion on one side of the slit (x—x) radially inwardly, means (50) rigidly connecting a minor portion of the periphery of the shell (44) on the other side of the slit (x—x) to the rigid inner core (28,30,32), the shell (44) being flexible on the one side of the slit (x—x) over a major portion of its periphery, and a plurality of rows of support members (57, 58), the support members of each row being aligned axially of the shell (44) and being pivotally connected at one end to the rigid inner core (28, 30, 32) and at the other end to the flexible portion of the shell (44), and the rigid inner core (28, 30, 32) being rotatably supported on the inside from only one end and the other end being free for removal of a fluid retaining wall formed on the shell (44).

2. A mandrel (10) as claimed in claim 1 wherein there are three of said rows of support members (57, 58).

3. A mandrel (10) as claimed in claim 1 wherein the extended longitudinal axes of the support members (57) of one row substantially intersect the line where the flexible portion of the shell (44) joins the rigid portion at the opposite side from the slit (x—x).

4. A mandrel (10) as claimed in claim 1 wherein the support members are turnbuckle connectors.

5. A mandrel (10) as claimed in claim 1 including a row of pneumatic actuators (64, 65) aligned axially of the shell (44) and pivotally connected at one end to the core (28, 30, 32) and at the other end to the shell (44) adjacent the slit (x—x).

* * * * *